J. C. JOHNSON.
PEACH PITTER.
APPLICATION FILED JULY 23, 1919.

1,321,311.

Patented Nov. 11, 1919.

INVENTOR
John C. Johnson
BY John A. Naismith
HIS ATTORNEY

UNITED STATES PATENT OFFICE.

JOHN C. JOHNSON, OF SAN JOSE, CALIFORNIA.

PEACH-PITTER.

1,321,311.  Specification of Letters Patent.  Patented Nov. 11, 1919.

Application filed July 23, 1919. Serial No. 312,746.

*To all whom it may concern:*

Be it known that I, JOHN C. JOHNSON, a citizen of the United States, and resident of San Jose, in the county of Santa Clara and State of California, have invented certain new and useful Improvements in Peach-Pitters, of which the following is a specification.

My invention relates to a machine for cutting and removing the pits from peaches and particularly from that variety known as the clingstone peach.

It is the object of my invention to provide a machine whereby clingstone peaches may be cut and the pit removed therefrom more quickly and efficiently than possible by any of the methods of performing this work known at the present time.

In the drawing:—

Figure 1:
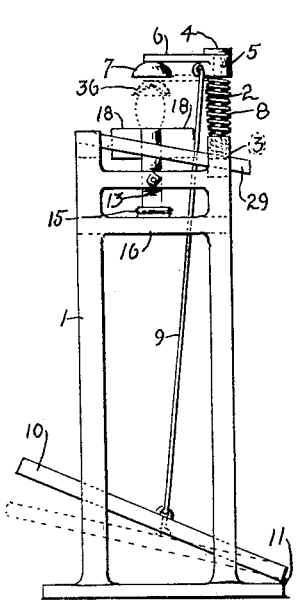
Figure 1 is a side elevation of the machine.
Figure 2:
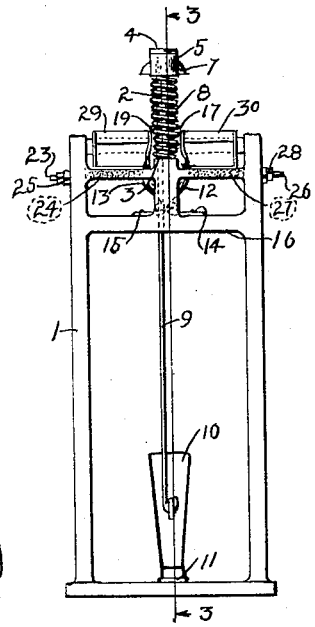
Fig. 2 is a front elevation of the same.
Figure 3:
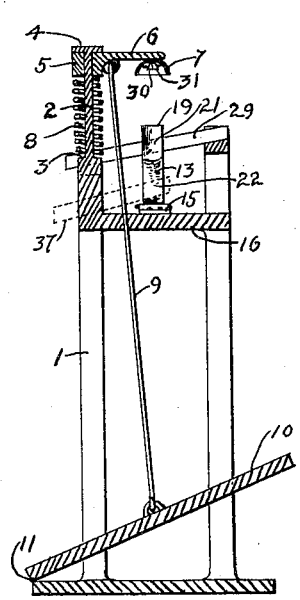
Fig. 3 is a sectional view on line 3—3 of Fig. 2.
Figure 4:
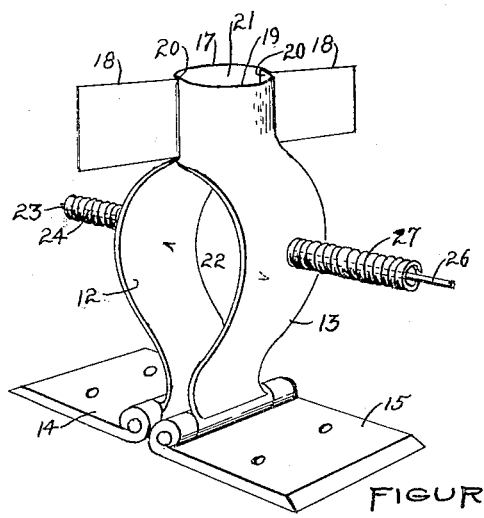
Fig. 4 is an enlarged perspective view of the principal cutters.
Figure 5:
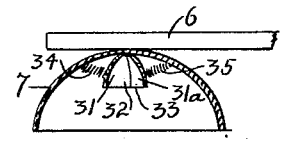
Fig. 5 is an enlarged sectional view of the secondary cutters.

Referring more particularly to the drawings, 1 indicates a framework of suitable proportions carrying a standard 2 provided with a shoulder 3 and a terminal member 4. On standard 2 is slidably mounted a collar 5 carrying an arm 6 from the end of which is a depending bell shaped member 7, collar 5 being normally held in a raised position against member 4 by a spring 8 engaging said collar and shoulder 3 on standard 2.

Collar 5 and arm 6 with depending member 7 is lowered at will by the operator of the machine through the medium of rod 9 attached thereto and to a foot pedal 10 hinged to frame 1 at 11.

Mounted on frame 1 in axial alinement with member 7 and a short distance below the same are cutters 12 and 13, in opposed relation to each other and hinged to base members 14 and 15 respectively which in turn are bolted to plate 16 forming a part of frame 1. Cutter 12 is provided with an oval or round cutting edge 17 and two straight laterally and oppositely extending cutting edges 18, these edges preferably lying in the same horizontal plane as shown. Cutter 13 is provided with an oval or round cutting edge 19 lying in the same horizontal plane as edges 17 and 18 and terminating within edge 17 so as to permit a telescoping action therein as shown at 20 and forming therewith an aperture 21. Cutters 12 and 13 are also curved outwardly to form a space as indicated at 22.

Attached to cutter 12 is a rod 23 extending therefrom through the side of frame 1 as shown, having a compression spring 24 placed thereon between frame 1 and said cutter 12 and provided with adjusting nuts 25 on the exterior of frame 1. Cutter 13 is provided with similar mechanism indicated by the numerals 26—27—28 respectively. Mounted upon frame 1 and positioned at an incline, one upon each side of cutters 12 and 13 are chutes 29 and 30, each chute being arranged to closely engage the adjacent cutter.

I have also mounted in bell shaped member 7 a pair of telescoping leaves 31 and 31ª provided with cutting edges 32 and 33 respectively, and normally held in an interlocking position by compression springs 34 and 35 respectively.

In operation a clingstone peach is placed in a vertical position on cutting edges 17 and 19, stem end downward. The foot pedal 10 is then operated to bring member 7 down upon the upper end of the peach as indicated in dotted lines at 36. The continued pressure downwardly of member 7 causes leaves 31 and 31ª to cut through the pulp and separate the same from the tip of the peach, and forces the pit downwardly through space 21, the cutting edges 18 cutting the pulp into two halves and the cutting edges 17 and 19 engaging the pit and separating the pulp therefrom as said pit passes through space 21 to space 22. The separated halves of the fruit fall into chutes 29 and 30 respectively and the pit into a chute or receptacle prepared therefor in space 22 as indicated at 37.

It is understood of course that any suitable means may be provided for carrying away the cut fruit and the pits and that any changes in form, proportion and details of construction and operation may be made within the scope of the appended claims.

I claim:

1. A fruit cutting and pitting machine including a pair of opposed hingedly mounted coöperating blades having oppositely curved cutting edges operating in substantially parallel relation to the axis of said blades and resilient means for normally holding said cutting edges in close relation to each other.

2. A fruit cutting and pitting machine including a pair of opposed coöperating blades having oppositely curved cutting edges operating in substantially parallel relation to the axis of said blades, resilient means for normally holding said cutting edges in close relation to each other, and means for adjusting said cutting edges with relation to each other.

3. A fruit pitting and cutting machine including a pair of opposed coöperating blades having oppositely curved cutting edges operating in substantially parallel relation to the axis of said blades and resilient means for normally holding said cutting edges in close relation to each other, said blades being hingedly mounted at the ends opposite said cutting edges and one of said blades carrying laterally extending members provided with cutting edges and all of said cutting edges lying in a plane perpendicular to the axis of said blades.

4. A fruit cutting and pitting machine including a frame, a pair of opposed coöperating blades hingedly mounted thereon, said blades having oppositely curved cutting edges and laterally extending cutting edges lying in a plane perpendicular to the axis of said blades and operating in substantially parallel relation to the axis of said blades, resilient means adjustably connected to said frame for normally holding said cutting edges in close relation to each other, means for forcing said cutting edges through a fruit placed thereon, means for removing the cut fruit from said cutters, and means for removing the pit from said cutters.

5. A fruit cutting and pitting machine including a frame, a pair of opposed coöperating blades hingedly mounted thereon, said blades having oppositely curved cutting edges and laterally extending cutting edges lying in a plane perpendicular to the axis of said blades and operating in substantially parallel relation to the axis of said blades, resilient means adjustably connected to said frame for normally holding said cutting edges in close relation to each other, a reciprocating cap axially mounted with relation to said cutters and adapted to engage fruit placed on said cutting edges, means for forcing said cap to engage said fruit and force the same over said cutters, and fruit cutting means operatively mounted in said cap.

6. A fruit cutting and pitting machine including a frame, a pair of opposed coöperating blades hingedly mounted thereon, said blades having oppositely curved cutting edges and laterally extending cutting edges lying in a plane perpendicular to the axis of said blades and operating in substantially parallel relation to the axis of said blades, resilient means adjustably connected to said frame for normally holding said cutting edges in close relation to each other, a reciprocating cap axially mounted with relation to said cutters and adapted to engage fruit placed on said cutting edges, means for forcing said cap to engage said fruit and force the same over said cutters, and a pair of leaves provided with cutting edges hingedly and resiliently mounted in said cap and adapted to cut the end of said fruit when said cap engages the same.

JOHN C. JOHNSON.